(12) United States Patent
Cohen et al.

(10) Patent No.: US 7,549,866 B2
(45) Date of Patent: Jun. 23, 2009

US007549866B2

(54) MANNEQUIN WITH MORE SKIN-LIKE PROPERTIES

(75) Inventors: Jason C. Cohen, Appleton, WI (US); Robert Carter Pilecky, Oshkosh, WI (US); Chad Patrick Satori, Manitowoc, WI (US); Frank Fritz Kromenaker, Hortonville, WI (US); David William Koenig, Menasha, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 306 days.

(21) Appl. No.: 11/300,700

(22) Filed: Dec. 15, 2005

(65) Prior Publication Data

US 2007/0160966 A1 Jul. 12, 2007

(51) Int. Cl.
G09B 23/28 (2006.01)
(52) U.S. Cl. .................................... 434/267
(58) Field of Classification Search ................ 434/262, 434/265, 267, 270, 272, 273, 275, 295
See application file for complete search history.

(56) References Cited

U.S. PATENT DOCUMENTS

| | | | |
|---|---|---|---|
| 4,596,528 A | | 6/1986 | Lewis et al. |
| 4,627,111 A | * | 12/1986 | Storie ............................... 2/69 |
| 4,877,454 A | | 10/1989 | Charkoudian |
| 5,015,431 A | | 5/1991 | Charkoudian |
| 5,727,948 A | * | 3/1998 | Jordan ......................... 434/267 |
| 5,775,916 A | * | 7/1998 | Cooper et al. ............... 434/267 |
| 5,803,746 A | * | 9/1998 | Barrie et al. ................. 434/267 |
| 6,083,008 A | * | 7/2000 | Yamada et al. .............. 434/267 |
| 6,110,451 A | * | 8/2000 | Matz et al. ................ 424/70.16 |
| 6,361,729 B1 | * | 3/2002 | Strover et al. ............... 264/247 |
| 6,503,525 B1 | * | 1/2003 | Paul et al. .................... 424/402 |
| 6,568,941 B1 | * | 5/2003 | Goldstein .................... 434/267 |
| 6,626,879 B1 | | 9/2003 | Ashton et al. |
| 6,854,976 B1 | * | 2/2005 | Suhr .......................... 434/273 |
| 6,957,961 B1 | * | 10/2005 | Owens et al. ................ 434/270 |
| 7,272,766 B2 | * | 9/2007 | Sakezles ..................... 714/742 |
| 2002/0161388 A1 | | 10/2002 | Samuels et al. |
| 2004/0122287 A1 | | 6/2004 | Minigh |
| 2005/0026125 A1 | * | 2/2005 | Toly ............................ 434/262 |
| 2005/0258199 A1 | | 11/2005 | Honer et al. |
| 2006/0099871 A1 | | 5/2006 | Poruthoor et al. |
| 2007/0077544 A1 | * | 4/2007 | Lemperle et al. ............ 434/262 |

FOREIGN PATENT DOCUMENTS

EP 0 530 718 A1 3/1993
EP 0 692 262 A2 1/1996

OTHER PUBLICATIONS

Elkhyat, Ahmed et al., "Influence of the Hydrophobic and Hydrophilic Characteristics of Sliding and Slider Surfaces on Friction Coefficient: In Vivo Human Skin Friction Comparison," Skin Research and Technolo,qy, vol. 10, 2004, pp. 215-221.*

American Society for Testing Materials (ASTM) Designation: D1894-93, "Standard Test Method for Static and Kinetic Coefficients of Friction of Plastic Film and Sheeting," pp. 455-460, published Dec. 1993.
Elkhyat, Ahmed et al., "Influence of the Hydrophobic and Hydrophilic Characteristics of Sliding and Slider Surfaces on Friction Coefficient: In Vivo Human Skin Friction Comparison," Skin Research and Technology, vol. 10, 2004, pp. 215-221.
Hof, Christoph and Hermann Hopermann, "Comparison of Replica- and In Vivo- Measurement of the Microtopography of Human Skin," SOFW Journal, published by Jahresbezugspreis Inland DM, Germany, vol. 126, Part 9, 2000, pp. 40-47.
"Super Special-Effects Silicone: Smith's Theatrical Prosthetic Deadener is the Key," EFX, Displays & Theatre, Developments, Polytek® Development Corp., Spring 2005, p. 6.
"Smith's Theatrical Prosthetic Gel System: Fact Sheet," GoLive CyberStudio 3, Internet web page "http://www.fxsmith.com/materials.html", viewed and printed prior to Dec. 15, 2005, 4 pages.
"PlatSil® Gel-10," Technical Bulletin, Polytek® Development Corp., 2005, 2 pages.
"SES 403, SES 406 & KE 108: Two-Component, Optically Clear Potting and Encapsulating Elastomers," brochure, ShinEtsu Silicones of America, Inc., Torrence, CA, Oct. 1994, 4 pages.
Dow Corning Corp., "Silicone Moldmaking Materials: A step-by-Step Guide to Product Selection," brochure, 2003, 6 pages.
Dow Corning Corp., "Rubbers/Elastomers," Dow Corning Healthcare—Selection Guide, brochure, available prior to Dec. 15, 2005, pp. 20-21.
Dow Corning Corp., "HS IV RTV High Strength Moldmaking Silicone Rubber and Thixo Additive," brochure, 1993, 4 pages.
Dow Corning Corp., "9506 Powder—Dimethicone/Vinyl Dimethicone Crosspolymer," Product Information sheet, available prior to Dec. 15, 2005, 1 page.
Dow Corning Corp., "Trefil E-506 S and 9506 Powder," Material Safety Data Sheet, Feb. 7, 2002, pp. 1-7.
Dow Corning Corp., "HS IV, 10:1, Colored Catalyst," Material Safety Data Sheet, Aug. 28, 2003, pp. 1-8.
Dow Corning Corp., "HS IV Mold Making Silicone Rubber Base," Material Safety Data Sheet, Jan. 25, 2002, pp. 1-7.
"Replica SILFLO Resin—R100," CuDerm, Internet web page "http://www.cuderm.com/catalog/product_info.php?products_id=58", Feb. 20, 2004, 2 pages.
"SILFLO Silicone Rubber," Product Safety Data Sheet, J&S Davis UK, Internet web page "http://www.msds.kcc.com/MSDS/Default.asp?S=35819", Feb. 21, 1998, pp. 1-9.
"SILFLO Thinner," Product Safety Data Sheet, J&S Davis UK, Internet web page "http://www.msds.kcc.com/MSDS/default.asp?S=35820&noHeader=1", Feb. 21, 1998, pp. 1-9.
"SILFLO/Flexibase Catalyst," Product Safety Data Sheet, J&S Davis UK, Internet web page "http://www.msds.kcc.com/MSDS/default.asp?S=35821&noHeader=1", Jun. 6, 1998, pp. 1-6.

* cited by examiner

Primary Examiner—Kurt Fernstrom
(74) Attorney, Agent, or Firm—David J. Arteman

(57) ABSTRACT

A mannequin suitable for testing absorbent articles has a surface having a coefficient of friction of 0.8 to 1.28 as measured by the Coefficient of Friction Test disclosed herein and a contact angle of 94 to 106 degrees as measured by the Contact Angle Test disclosed herein. In various embodiments, the mannequin may further have an indentation value of 3 to 7 kPa over the range of 0 to 4 mm of depth as measured by the Indentation Test disclosed herein. In various embodiments, the mannequin may further have a transmittance value of 50 to 90 percent, a haze value of 8 to 65 percent, and a clarity value of 10 to 80 percent as measured by the Optical Characteristics Test disclosed herein.

6 Claims, No Drawings

MANNEQUIN WITH MORE SKIN-LIKE PROPERTIES

BACKGROUND OF THE INVENTION

Absorbent articles, particularly disposable absorbent articles, have undergone an evolution since they first became commercially available. Materials and features made available by new technologies have improved the function and fit of absorbent articles. Before new designs and features become available on commercial products, substantial research and development efforts are necessary to ensure that the products will perform as expected. Development efforts typically include "bench top" laboratory tests to measure features and performance such as absorbency, strength, flexibility or breathability. While reliable and useful, the bench top tests are not capable of fully accounting for the conditions experienced during normal use of absorbent articles. Therefore, absorbent articles are frequently tested through use by consumers who later provide feedback.

While the results are extremely useful, consumer use testing can be costly and time consuming. In order to bridge the gap between bench top test methods and consumer use tests, product testing with life-like models may be used to test the design and performance of absorbent articles. Life-like models such as mannequins may be used to test absorbent articles under more realistic conditions without the time and the cost incurred for consumer testing.

As such, mannequin systems have been developed specifically for testing absorbent articles. While such systems are useful for conducting performance testing, current mannequin surface properties do not mimic human skin properties. Therefore, more skin-like mannequin surface properties are needed to improve the correlation between mannequin testing and in vivo performance.

SUMMARY OF THE INVENTION

In response to these needs, the present invention provides mannequins having more skin-like surface properties.

In one aspect, the present invention provides a mannequin having a surface with a coefficient of friction of 0.8 to 1.28 as measured by the Coefficient of Friction Test disclosed herein and a contact angle of 94 to 106 degrees as measured by the Contact Angle Test disclosed herein.

In some embodiments, the mannequin may have a compression value of less than 200 grams-force as measured by the Compression Test disclosed herein.

In some embodiments, the mannequin may have a Young's modulus of 3 to 7 kPa over the depth of 0 to 4 mm as measured by the Indentation Test disclosed herein.

In some embodiments, the surface of the mannequin may include keratin. In some embodiments, the keratin may be 5 to 10 percent by weight.

In some embodiments, the surface of the mannequin may include silicone.

In some embodiments, the surface of the mannequin may have a coefficient of friction of 0.8 to 1.0 as measured by the Coefficient of Friction Test disclosed herein.

In some embodiments, the surface of the mannequin may have a coefficient of friction of 0.84 to 0.96 as measured by the Coefficient of Friction Test disclosed herein.

In some embodiments, the mannequin may have a transmittance value of 50 to 90 percent, a haze value of 20 to 65 percent, and a clarity value of 10 to 50 percent as measured by the Optical Characteristics Test disclosed herein.

In another aspect, a mannequin has a surface with a coefficient of friction of 0.8 to 1.82 as measured by the Coefficient of Friction Test disclosed herein, a contact angle of 94 to 106 degrees as measured by the Contact Angle Test disclosed herein, a transmittance value of 50 to 90 percent, a haze value of 8 to 65 percent, and a clarity value of 10 to 80 percent as measured by the Optical Characteristics Test disclosed herein.

In some embodiments, the mannequin may have a compression value of less than 200 grams-force as measured by the Compression Test disclosed herein.

In some embodiments, the surface of the mannequin may include silicone.

In some embodiments, the surface of the mannequin may have a coefficient of friction of 0.8 to 1.0 as measured by the Coefficient of Friction Test disclosed herein.

In some embodiments, the surface of the mannequin may have a contact angle of 94 to 98 degrees as measured by the Contact Angle Test disclosed herein.

In some embodiments, the surface of the mannequin may have a coefficient of friction of 0.84 to 0.96 as measured by the Coefficient of Friction Test disclosed herein, a contact angle of 94 to 95 degrees as measured by the Contact Angle Test disclosed herein, a transmittance value of 80 to 90 percent, a haze value of 20 to 25 percent, and a clarity value of 40 to 50 percent as measured by the Optical Characteristics Test disclosed herein.

In some embodiments, the surface of the mannequin may have a coefficient of friction of 0.8 to 1.28 as measured by the Coefficient of Friction Test disclosed herein, a contact angle of 94 to 106 degrees as measured by the Contact Angle Test disclosed herein, and the mannequin may have an indentation value of 3 to 7 kPa over the range of 0 to 4 mm of depth as measured by the Indentation Test disclosed herein.

In some embodiments, the surface of the mannequin may include keratin. In some embodiments, the keratin may be 5 to 10 percent by weight.

In some embodiments, the surface of the mannequin may include silicone.

In some embodiments, the surface of the mannequin may have a coefficient of friction of 0.8 to 0.9 as measured by the Coefficient of Friction Test disclosed herein, a contact angle of 105 to 106 degrees as measured by the Contact Angle Test disclosed herein, and the mannequin may have an indentation value of about 6 kPa over the range of 0 to 4 mm of depth as measured by the Indentation Test disclosed herein.

DETAILED DESCRIPTION

The present disclosure of the invention will be expressed in terms of its various components, elements, constructions, configurations, arrangements and other features that may also be individually or collectively be referenced by the term, "aspect(s)" of the invention, or other similar terms. It is contemplated that the various forms of the disclosed invention may incorporate one or more of its various features and aspects, and that such features and aspects may be employed in any desired, operative combination thereof.

The present invention provides mannequins that are adapted to better simulate the soft tissue surface properties of human subjects, particularly coefficient of friction, water contact angle, indentation, and compression. In some aspects, the present invention further provides mannequins that are optically adapted for internal observations while still simulating the soft tissue surface properties of human skin. For absorbent articles, particularly disposable absorbent articles, adequate comfort, containment, and control of bodily wastes requires an understanding of how absorbent articles fit, move and interact with the body and skin of the wearer in actual use. The mannequins of the present invention permit the controlled simulation of the interaction between absorbent articles and the human body. The optically adapted aspects further permit internal visual observation of the interaction between the absorbent articles and the mannequin surface.

Currently-available mannequins typically are constructed of various formulations of silicone. For example, Animax Designs having offices at 210 Venture Circle, Nashville, Tenn., USA produces several sizes of infant, child and adult mannequin torsos using various silicone formulations.

Typical silicones are easy to handle but may have surfaces with an excessively high coefficient of friction and high water contact angle as compared to human skin. As such, evaluation of absorbent articles in contact with mannequins having a typical silicone surface may not adequately simulate the contact and interaction between absorbent articles and actual human skin. Also, mannequins having typical silicone construction may not be suitable for internal observation because typical silicones are not sufficiently clear.

To address these issues, various samples were evaluated to determine suitability for use as mannequin materials. These samples were evaluated to determine one or more of the following: coefficient of friction, contact angle, indentation, compression, and optical characteristics. The sample compositions and test methods are described below.

Sample Descriptions

Thirty three formulations were prepared and subjected to one or more tests. Polymers were blended and cured in compliance with manufacturers' recommendations. Unless otherwise stated, samples were cured on a flat surface to ensure equivalent thickness throughout the entire specimen. All samples comprised one or more of the following components: Dow Corning® C6-515 silicone; Shin-Etsu SES 406 silicone; SMITH'S THEATRICAL PROSTHETIC DEADENER additive; keratin; SILFLO silicone impression material; Dow Corning® HS IV RTV silicone; silicone thinner; and Dow Corning® 9506 silicone.

Dow Corning® C6-515 silicone is a liquid silicone rubber. Dow Corning® C6-515 silicone is a two-part (1:1 by weight), platinum-catalyzed silicone elastomer obtained from Dow Corning Corporation having offices at South Saginaw Road, Midland, Mich., 48686, USA.

Shin-Etsu SES 406 silicone is a two component silicone rubber organopolysiloxane mixture of a base and CAT-1202 hardening catalyst available from Shin-Etsu Silicones of America, Inc., having offices at 1150 Damar Drive, Akron, Ohio, 44305, USA.

SMITH'S THEATRICAL PROSTHETIC DEADENER additive is an organosiloxane designed to lower the hardness of liquid rubbers. SMITH'S THEATRICAL PROSTHETIC DEADENER additive is available from Polytek Development Corporation having offices at 55 Hilton Street, Toronto, Canada, M6M 4L8. Generally, the addition of SMITH'S THEATRICAL PROSTHETIC DEADENER to silicones before curing increases the stickiness of the silicones and decreases the hardness of the silicones.

Keratin is a purified fibrous protein powder derived from hooves and horns. Fibrous proteins are substances having fiber-like structures and serve as the chief structural material in various tissues. Corresponding to this structural function, fibrous proteins are relatively insoluble in water and unaffected by moderate changes in temperature and pH. The fibrous protein category also includes collagens and elastins, keratins, fibrins, fibronectins and myosins. Collagens and elastins are the proteins of the connective tissues, such as, tendons and ligaments. Keratins are the proteins that are the major components of skin, hair, feathers and horn. Fibrin is a protein formed when blood clots. Fibronectin is extracellular matrix protein. Myosin is muscle protein. Other insoluble proteins include insoluble milk proteins, silk protein, insoluble rice protein, insoluble soy protein, and insoluble wheat protein. The keratin powder used herein is available under catalog number 902111 from MP Biomedicals, LLC having offices at 15 Morgan, Irvine, Calif., 92618, USA.

SILFLO silicone impression material is a silicone elastomer, specifically polydimethyl siloxane and is a combination of a paste and a catalyst. SILFLO silicone impression material is characterized as having a boiling point greater than 35 degrees centigrade, a specific gravity of approximately 1.6, and a viscosity of 16,000 MPA. SILFLO silicone impression material includes filler that is a blend of silicon-zirconium oxide particles and aluminum. SILFLO silicone impression material is available from J&S Davis having offices at Summit House, Summit Road, Potters Bar, Herts, England.

Dow Corning® HS IV RTV silicone is a silicone elastomer mold making rubber having high strength and low durometer. Dow Corning® HS IV RTV silicone is made by mixing Dow Corning® HS IV mold making rubber base with HS IV Catalyst in a ratio of 10 parts base to 1 part catalyst. The Dow Corning® HS IV base is a viscous liquid characterized by the following properties: a specific gravity of 1.15 at 25° C., a viscosity of 30,000 cps, a boiling point greater than 35° C. and a nonvolatile content of 98 percent. The Dow Corning® HS IV base contains polydimethylsiloxane—631 48-62-9, Dimethyl siloxane, hydroxyl-terminated—70131-67-9, trimethylated silica—68909-20-6, zircon-14940-68-2 and acetaldehyde 75-07-0. The Dow Corning® HS IV catalyst is a liquid characterized by the following properties: a specific gravity of 0.9 at 25° C., a viscosity of 50 cSt, and a boiling point of greater than 66° C. The Dow Corning® HS IV RTV silicone elastomer is characterized by the following typical properties: a Shore A durometer hardness of 5, an elongation at break of 675 percent, a linear shrinkage of 0.3 percent, a mixed viscosity of 170 poise, and a tear strength of 17 kN/m. Dow Corning® HS IV RTV silicone is available from Composites One having offices at 850 Heritage Road, De Pere, Wis., 54115, USA.

Silicone thinner is a non-reactive silicone fluid that lowers the mixed viscosity of tin or platinum cured silicone rubber products. Use of a thinner provides decreased Shore A hardness of cured polymers, increased pot life and improved degassing action. A suitable silicone thinner is Mold Max™ thinner available from Smooth-On, Inc. having offices at 2000 Saint John Street, Easton, Pa., 18042, USA.

Dow Corning® 9506 silicone is a spherical white powder comprised of dimethicone/vinyl dimethicone crosspolymer. Dow Corning® 9506 silicone is characterized by the following typical properties: an average particle size of 4 microns and a specific gravity of 0.98 at 25° C. Dow Corning® 9506 silicone is available from Dow Corning Corporation having offices at Dow Corning Corporation Corporate Center, South Saginaw Road, Midland, Mich. 48686, USA.

Sample 1 was prepared with 49.8 grams Shin-Etsu SES 406 silicone base thoroughly mixed with 49.91 grams of Shin-Etsu CAT-1202 hardening catalyst. Sample 1 was degassed using a vacuum chamber prior to measuring the optical characteristics to prevent formation of air bubbles.

Sample 2 was prepared with 41.3 grams Shin-Etsu SES 406 silicone base thoroughly mixed with 41.75 grams of Shin-Etsu CAT-1202 hardening catalyst. To this mixture, 17.25 grams SMITH'S THEATRICAL PROSTHETIC DEADENER additive was added and thoroughly mixed. Sample 2 was degassed using a vacuum chamber prior to measuring the optical characteristics to prevent formation of air bubbles.

Sample 3 was prepared with 39.64 grams Shin-Etsu SES 406 silicone base thoroughly mixed with 38.99 grams of Shin-Etsu CAT-1202 hardening catalyst. To this mixture, 22.08 grams SMITH'S THEATRICAL PROSTHETIC DEADENER additive was added and thoroughly mixed. Sample 3 was degassed using a vacuum chamber prior to measuring the optical characteristics to prevent formation of air bubbles.

Sample 4 was prepared with 33.39 grams Shin-Etsu SES 406 silicone base thoroughly mixed with 33.5 grams of Shin-Etsu CAT-1202 hardening catalyst. To this mixture, 33.11 grams SMITH'S THEATRICAL PROSTHETIC DEADENER additive was added and thoroughly mixed. Sample 4 was degassed using a vacuum chamber prior to measuring the optical characteristics to prevent formation of air bubbles.

Sample 5 was prepared with 27.76 grams Shin-Etsu SES 406 silicone base thoroughly mixed with 27.44 grams of Shin-Etsu CAT-1202 hardening catalyst. To this mixture, 45.37 grams SMITH'S THEATRICAL PROSTHETIC DEADENER additive was added and thoroughly mixed. Sample 5 was degassed using a vacuum chamber prior to measuring the optical characteristics to prevent formation of air bubbles.

Sample 6 was prepared with 25.70 grams Shin-Etsu SES 406 silicone base thoroughly mixed with 25.75 grams of Shin-Etsu CAT-1202 hardening catalyst. To this mixture, 51.21 grams SMITH'S THEATRICAL PROSTHETIC DEADENER additive was added and thoroughly mixed. Sample 6 was degassed using a vacuum chamber prior to measuring the optical characteristics to prevent formation of air bubbles.

Sample 7 was prepared with 16.68 grams Shin-Etsu SES 406 silicone base thoroughly mixed with 16.47 grams of Shin-Etsu CAT-1202 hardening catalyst. To this mixture, 66.95 grams SMITH'S THEATRICAL PROSTHETIC DEADENER additive was added and thoroughly mixed. Sample 7 was degassed using a vacuum chamber prior to measuring the optical characteristics to prevent formation of air bubbles.

Sample 8 was prepared with 100 grams Dow Corning® C6-515 liquid silicone rubber.

Sample 9 was prepared with 48.35 grams of Dow Corning® HS IV RTV silicone base mixed thoroughly with 4.82 grams Dow Corning® HS IV catalyst and 42.37 grams Mold Max™ silicone thinner. To this mixture, 5 grams keratin powder was added and mixed in thoroughly.

Sample 10 was prepared with 30.63 grams of Dow Corning® HS IV RTV silicone base mixed thoroughly with 3.24 grams Dow Corning® HS IV catalyst. To this mixture, 7.51 grams keratin powder was added and mixed in thoroughly. To this mixture, 34.8 grams of SILFLO silicone impression material and 57 drops of SILFLO catalyst were added and mixed in thoroughly.

Sample 11 was prepared with 33.07 grams of Dow Corning® HS IV RTV silicone base mixed thoroughly with 3.4 grams Dow Corning® HS IV catalyst and 14.92 grams Mold Max™ silicone thinner. To this mixture, 3.43 grams Dow Corning® 9506 silicone was added and mixed in thoroughly. To this mixture, 3.72 grams keratin powder was added and mixed in thoroughly. To this mixture, 17.78 grams of SILFLO silicone impression material and 30 drops of SILFLO catalyst were added and mixed in thoroughly.

Sample 12 was prepared with 33.75 grams of Dow Corning® HS IV RTV silicone base mixed thoroughly with 3.61 grams Dow Corning® HS IV catalyst. To this mixture, 37 grams of SILFLO silicone impression material and 63 drops of SILFLO catalyst were added and mixed in thoroughly.

Sample 13 was prepared with 90.6 grams of Dow Corning® HS IV RTV silicone base mixed thoroughly with 9.3 grams Dow Corning® HS IV catalyst.

Sample 14 was prepared with 50.02 grams of Dow Corning® HS IV RTV silicone mixed thoroughly with 5.1 grams Dow Corning® HS IV catalyst and 45 grams Mold Max™ silicone thinner.

Sample 15 was prepared with 44.45 grams Dow Corning® HS IV RTV silicone base mixed thoroughly with 5.1 grams Dow Corning® HS IV catalyst and 40.5 grams Mold Max™ silicone thinner. To this mixture, 10.01 grams keratin powder was added and mixed in thoroughly.

Sample 16 was prepared with 30.73 grams of SILFLO silicone impression material mixed thoroughly with 51 drops of SILFLO catalyst.

Sample 17 was prepared with 19.2 grams of Dow Corning® HS IV RTV silicone base mixed thoroughly with 1.99 grams Dow Corning® HS IV catalyst and 17.3 grams Mold Max™ silicone thinner. To this mixture, 37.52 grams of SILFLO silicone impression material and 63 drops of SILFLO catalyst were added and mixed in thoroughly.

Sample 18 was prepared with 47.5 grams of SILFLO silicone impression material mixed thoroughly with 79 drops of SILFLO catalyst. To this mixture, 2.5 grams keratin powder was added and mixed in thoroughly.

Sample 19 was prepared with 81.37 grams of Dow Corning® HS IV RTV silicone base mixed thoroughly with 8.5 grams Dow Corning® HS IV catalyst. To this mixture, 10.1 grams keratin powder was added and mixed in thoroughly.

Sample 20 was prepared with 59.21 grams of Dow Corning® HS IV RTV silicone base mixed thoroughly with 6.34 grams Dow Corning® HS IV catalyst and 16.51 grams Mold Max™ silicone thinner. To this mixture, 7.57 grams Dow Corning® 9506 silicone was added and mixed in thoroughly. To this mixture, 10 grams keratin powder was added and mixed in thoroughly.

Sample 21 was prepared with 13.6 grams of Dow Corning® HS IV RTV silicone base mixed thoroughly with 1.33 grams Dow Corning® HS IV catalyst and 12.8 grams Mold Max™ silicone thinner. To this mixture, 5.93 grams Dow Corning® 9506 silicone was added and mixed in thoroughly. To this mixture, 7.52 grams keratin powder was added and mixed in thoroughly. To this mixture, 33.65 grams of SILFLO and 57 drops of SILFLO catalyst were added and mixed in thoroughly.

Sample 22 was prepared with 85.82 grams of Dow Corning® HS IV RTV silicone base mixed thoroughly with 8.9 grams Dow Corning® HS IV catalyst. To this mixture, 5 grams keratin powder was added and mixed in thoroughly.

Sample 23 was prepared with 66.19 grams of Dow Corning® HS IV RTV silicone base mixed thoroughly with 6.34 grams Dow Corning® HS IV catalyst and 18.68 grams Mold Max™ silicone thinner. To this mixture, 8.5 grams Dow Corning® 9506 silicone was added and mixed in thoroughly.

Sample 24 was prepared with 45.20 grams of Dow Corning® HS IV RTV silicone base mixed thoroughly with 4.68 grams Dow Corning® HS IV catalyst and 40.63 grams Mold Max™ silicone thinner. To this mixture, 8.47 grams Dow Corning® 9506 silicone was added and mixed in thoroughly.

Sample 25 was prepared with 38.47 grams of Dow Corning® HS IV RTV silicone base mixed thoroughly with 3.82 grams Dow Corning® HS IV catalyst and 33.62 grams Mold Max™ silicone thinner. To this mixture, 15.63 grams Dow Corning® 9506 silicone was added and mixed in thoroughly. To this mixture, 10.19 grams keratin powder was added and mixed in thoroughly.

Sample 26 was prepared with 50 grams of SILFLO silicone impression material mixed thoroughly with 83 drops of SIL-FLO catalyst. To this mixture, 5.25 grams keratin powder was added and mixed in thoroughly.

Sample 27 was prepared with 16.95 grams of Dow Corning® HS IV RTV silicone base mixed thoroughly with 1.63 grams Dow Corning® HS IV catalyst and 14.95 grams Mold Max™ silicone thinner. To this mixture, 7.52 grams keratin powder was added and mixed in thoroughly. To this mixture, 33.65 grams of SILFLO silicone impression material and 56 drops of SILFLO catalyst were added and mixed in thoroughly.

Sample 28 was prepared with 40.55 grams of Dow Corning® HS IV RTV silicone base mixed thoroughly with 4.75 grams Dow Corning® HS IV catalyst and 37.14 grams Mold Max™ silicone thinner. To this mixture, 16.85 grams Dow Corning® 9506 silicone was added and mixed in thoroughly.

Sample 29 was prepared with 15.92 grams of Dow Corning® HS IV RTV silicone base mixed thoroughly with 1.72 grams Dow Corning® HS IV catalyst and 9.44 grams Mold Max™ silicone thinner. To this mixture, 6.29 grams Dow Corning® 9506 silicone was added and mixed in thoroughly. To this mixture, 37.45 grams of SILFLO silicone impression material and 63 drops of SILFLO catalyst were added and mixed in thoroughly.

Sample 30 was prepared with 41.1 grams of Dow Corning® HS IV RTV silicone base mixed thoroughly with 4.69 grams Dow Corning® HS IV catalyst and 37.6 grams Mold Max™ silicone thinner. To this mixture, 7.60 grams Dow Corning® 9506 silicone was added and mixed in thoroughly. To this mixture, 10 grams keratin powder was added and mixed in thoroughly.

Sample 31 was prepared with 40.2 grams of Dow Corning® HS IV RTV silicone base mixed thoroughly with 3.91 grams Dow Corning® HS IV catalyst and 35.24 grams Mold Max™ silicone thinner. To this mixture, 16.10 grams Dow Corning® 9506 silicone was added and mixed in thoroughly. To this mixture, 5.09 grams keratin powder was added and mixed in thoroughly.

Sample 32 was prepared with 70.75 grams of Dow Corning® HS IV RTV silicone base mixed thoroughly with 7.75 grams Dow Corning® HS IV catalyst and 22.6 grams Mold Max™ silicone thinner.

Sample 33 was prepared with 63.5 grams of Dow Corning® HS IV RTV silicone base mixed thoroughly with 6.5 grams Dow Corning® HS IV catalyst and 20.2 grams Mold Max™ silicone thinner. To this mixture, 10 grams keratin powder was added and mixed in thoroughly.

The components and the weight percentages of samples 1 to 33 are summarized in Table 1 below.

TABLE 1

Sample Summary

| Sample | Dow Corning® C6-515 silicone | Shin-Etsu SES 406 | SMITH'S THEATRICAL PROSTHETIC DEADENER additive | keratin | SILFLO silicone impression material | Dow Corning® HS IV RTV silicone | Mold Max™ silicone thinner | Dow Corning® 9506 silicone powder |
|---|---|---|---|---|---|---|---|---|
| 1 | — | 100.0% | — | — | — | — | — | — |
| 2 | — | 83.0% | 17.0% | — | — | — | — | — |
| 3 | — | 78.0% | 22.0% | — | — | — | — | — |
| 4 | — | 67.0% | 33.0% | — | — | — | — | — |
| 5 | — | 55.0% | 45.0% | — | — | — | — | — |
| 6 | — | 50.0% | 50.0% | — | — | — | — | — |
| 7 | — | 33.0% | 67.0% | — | — | — | — | — |
| 8 | 100.0% | — | — | — | — | — | — | — |
| 9 | — | — | — | 5.0% | — | 52.3% | 42.8% | — |
| 10 | — | — | — | 10.0% | 45.0% | 45.0% | — | — |
| 11 | — | — | — | 5.0% | 23.8% | 47.7% | 19.6% | 4.0% |
| 12 | — | — | — | — | 50.0% | 50.0% | — | — |
| 13 | — | — | — | — | — | 100.0% | — | — |
| 14 | — | — | — | — | — | 55.0% | 45.0% | — |
| 15 | — | — | — | 10.0% | — | 49.5% | 40.5% | — |
| 16 | — | — | — | — | 100.0% | — | — | — |
| 17 | — | — | — | — | 50.0% | 27.5% | 22.5% | — |
| 18 | — | — | — | 5.0% | 95.0% | — | — | — |
| 19 | — | — | — | 10.0% | — | 90.0% | — | — |
| 20 | — | — | — | 10.0% | — | 65.5% | 16.8% | 7.7% |
| 21 | — | — | — | 10.0% | 45.0% | 20.5% | 16.8% | 7.7% |
| 22 | — | — | — | 5.0% | — | 95.0% | — | — |
| 23 | — | — | — | — | — | 72.8% | 18.7% | 8.5% |
| 24 | — | — | — | — | — | 50.3% | 41.2% | 8.5% |
| 25 | — | — | — | 10.0% | — | 41.1% | 33.6% | 15.3% |
| 26 | — | — | — | 10.0% | 90.0% | — | — | — |
| 27 | — | — | — | 10.0% | 45.0% | 24.8% | 20.3% | — |
| 28 | — | — | — | — | — | 45.7% | 37.4% | 17.0% |
| 29 | — | — | — | — | 50.0% | 22.8% | 18.7% | 8.5% |
| 30 | — | — | — | 10.0% | — | 45.3% | 37.1% | 7.7% |
| 31 | — | — | — | 5.0% | — | 43.3% | 35.5% | 16.2% |
| 32 | — | — | — | — | — | 77.5% | 22.5% | — |
| 33 | — | — | — | 10.0% | — | 69.8% | 20.3% | — |

Coefficient of Friction

The coefficient of friction generally reflects the ease by which a first surface may move across a second surface. In order to more accurately simulate human skin, it is desirable for mannequins to include surfaces that have coefficients of friction more similar to that of human skin.

According to Elkhyat et al. in Skin Research and Technology 2004, entitled "Influence of the hydrophobic and hydrophilic characteristics of sliding and slider surfaces on friction coefficient: in vivo human skin friction comparison" found in volume 10 at pages 215-221, the coefficient of friction of human skin generally varies over the range of 0.12 to 0.74 depending on the sliding material used and the location of the skin being tested among other factors. Therefore, it is desirable for mannequins to include surfaces that have a coefficient of friction value closer to this same range. Currently available mannequins with typical silicone surfaces have such high friction that the Coefficient of Friction Test described herein is unable to measure a value.

The coefficient of friction measurement was attempted for all 33 samples utilizing the Coefficient of Friction Test described herein. However, some samples experienced "slip-stick" wherein the sample would not slide initially. After sufficient force was applied, the material would release, jump forward and re-stick. These samples are labeled "NV" indicating that no coefficient of friction value could be determined.

The thickness of the samples was 1 to 5 mm to provide adequate thickness to prevent interaction between the platen (table) and the material on the sled and to minimize deformation that may occur during testing.

The Coefficient of Friction Test measures the coefficient of friction between two materials. The test determines the sustained sliding (kinetic) friction of a material or surface when sliding over another material or surface and is a modification of ASTM method D 1894-93, 2004 with the following particulars.

A sled, which had the test specimen attached thereto, was pulled over a platen (table) that had another testing material attached thereto. The testing material was a 2.098 ounce/square yard (71 grams/square meter) continuous filament stretch bonded laminate nonwoven having facings comprising 13.56 gsm spunbonded polypropylene round fibers with H&P bond pattern facing. The test specimen and the material on the platen were in surface-to-surface contact with each other. The coefficient of friction value was defined as the measure of the relative difficulty when the surface of the test specimen slid over an adjoining surface of the testing material. "STATIC" coefficient of friction was described as the highest instantaneous value obtained to begin movement between the surfaces. "KINETIC" coefficient of friction was the average of the values obtained during the 60 seconds of the test (6 inch travel distance).

The testing apparatus used was a LAB MASTER Slip and Friction Model 32-90 with a model number 32-90-06 test sled; both of which are available from Testing Machines, Inc. of Islanda, N.Y., 11722, U.S.A. This apparatus was equipped with a digital display, and the apparatus automatically calculated and displayed the kinetic coefficient of friction. The sled used for the testing had a weight of 100 grams. Testing occurred in a room having a temperature of between about 22° C. and about 24° C., and a relative humidity of about 50 percent.

The test material mounted to the platen (table) had a length of about 305 millimeters and a width of about 102 to 127 millimeters. The test material was mounted to the platen (table) using a double-sided tape. The test specimen mounted to the sled had a length of about 100 millimeters and a width of about 63 millimeters. The test specimen was mounted to the sled using a double-sided tape.

The sled was lowered by the test equipment before testing and positioned lightly onto the test material when the test was started to prevent any unnatural bond from developing. The length of the sled and the length dimension of the plane-mounted material were parallel. The moving platen was then put in motion at a velocity of 6 inches per minute. The gauge took readings and continued to do so for about 60 seconds (6 inches of travel). The gauge measured and stored the "STATIC" value for the highest instantaneous coefficient of friction value obtained to begin the movement between the surfaces within the first inch of pull. The "KINETIC" value obtained and stored was the average of the values obtained during the 60 seconds of the test (6 inch travel distance).

The calculation for "KINETIC" coefficient of friction was obtained by using the equation, $\mu_k = A_k/B$, where '$\mu_k$' equals the kinetic coefficient of friction value, '$A_k$' equals the average gram value obtained during the 60 second test period, and 'B' equals the sled weight of about 100 grams. The calculation for "STATIC" coefficient of friction was obtained by using the equation, $\mu_s = A_s/B$, where '$\mu_s$' equals the static coefficient of friction value, '$A_s$' equals the maximum initial gram value obtained within the first inch of pull, and 'B' equals the sled weight of about 100 grams.

The coefficient of friction evaluation was performed five times for each sample. The coefficient of friction results are recorded in Table 2 below.

TABLE 2

Coefficient of Friction Summary

| Code | Coefficient of friction | Standard Deviation | Thickness (mm) |
|---|---|---|---|
| 1 | 0.84 | 0.05 | 1-5 |
| 2 | 1.07 | 0.07 | 1-5 |
| 3 | 1.43 | 0.1 | 1-5 |
| 4 | 1.22 | 0.16 | 1-5 |
| 5 | 1.82 | 0.23 | 1-5 |
| 6 | 2.16 | 0.22 | 1-5 |
| 7 | 2.51 | 0.5 | 1-5 |
| 8 | NV | NV | 1-5 |
| 9 | NV | NV | 1-5 |
| 10 | 1.84 | 0.07 | 1-5 |
| 11 | 2.07 | 0.08 | 1-5 |
| 12 | 1.55 | 0.1 | 1-5 |
| 13 | NV | NV | 1-5 |
| 14 | 1.25 | 0.06 | 1-5 |
| 15 | NV | NV | 1-5 |
| 16 | 0.96 | 0.14 | 1-5 |
| 17 | 1.55 | 0.08 | 1-5 |
| 18 | 0.87 | 0.04 | 1-5 |
| 19 | 2.17 | 0.07 | 1-5 |
| 20 | 1.87 | 0.15 | 1-5 |
| 21 | 1.83 | 0.07 | 1-5 |
| 22 | 1.55 | 0.19 | 1-5 |
| 23 | 1.63 | 0.1 | 1-5 |
| 24 | 1.46 | 0.13 | 1-5 |
| 25 | NV | NV | 1-5 |
| 26 | 0.84 | 0.11 | 1-5 |
| 27 | 1.65 | 0.08 | 1-5 |
| 28 | 2.75 | 0.18 | 1-5 |
| 29 | 1.41 | 0.08 | 1-5 |
| 30 | 2.26 | 0.21 | 1-5 |
| 31 | 1.7 | 0.24 | 1-5 |
| 32 | 1.38 | 0.08 | 1-5 |
| 33 | 1.28 | 0.21 | 1-5 |

Based on this data, mannequins may be made having surfaces with coefficient of friction values of about 0.8 to 2.75, about 0.8 to 2.07, about 0.8 to 1.55, about 0.8 to 1.28, about 0.8 to 1.0 or 0.84 to 0.96. These coefficient of friction values more closely simulate the coefficient of friction value of human skin, i.e., 0.12 to 0.74, than do current mannequins.

Contact Angle

The contact angle provides one way to measure the wettability or hydrophobicity of the various samples. In order to more accurately simulate human skin, it is desirable for mannequins to include surfaces that have contact angle values more similar to that of human skin. This is particularly useful when conducting wet article evaluations wherein simulated urine and/or feces are introduced into the absorbent article. It is believed that the ability of the article to retain and absorb urine and/or feces is affected, in part, by the contact angle value of the surface in contact with the absorbent article. In use, the surface in contact with the absorbent article is the skin of the wearer. In simulation, the surface in contact with the absorbent article is that of the mannequin.

The contact angle of human skin is approximately 91 degrees as reported by Elkhyat et al. in Skin Research and Technology 2004, entitled "Influence of the hydrophobic and hydrophilic characteristics of sliding and slider surfaces on friction coefficient: in vivo human skin friction comparison" found in volume 10 at pages 215-221. Therefore, it is desirable for mannequins to include surfaces with contact angles closer to about 91 degrees. Currently available mannequins with typical silicone surfaces have contact angles of about 105 degrees. Table 3 summarizes the contact angle measurements obtained from the samples tested.

The Contact Angle Test was performed on the DSA10-MK2 Drop Shape Analysis System controlled by the DSA10 control unit in accord with the instruction manual provided therewith. The apparatus is available from Krüss USA having offices at 1020 Crews Road, Suite K, Matthews, N.C., 28105-7584, USA and the manual is entitled "DSA1 Drop Shape Analysis User Manual V010212" copyrighted by KRÜSS GmbH, Hamburg, Germany in 2001.

The material sample was aligned on the stage of the contact angle machine so that it was level in every direction. The liquid delivery tubes were purified of air bubbles and 13 µl of distilled water was placed on the sample. The drop was then viewed through the J1H High-speed camera using the Drop Shape Analysis program. The stage was moved to position the drop relative to the camera. The stage was manipulated until the camera was level with the surface of the sample. Once the drop was placed onto the sample and properly aligned a picture was taken by selecting the snapshot icon in the Drop Shape Analysis program. The contact angle was measured by calculating the left and right contact angles using the equation, $\lambda_{lv} \cos \theta = \lambda_{sv} - \lambda_{sl} - \pi_e$, where 'lv' is the boundary formed by the liquid and vapor states, 'sl' is the boundary formed by the solid and liquid states, and 'sv' is the boundary formed by the solid and vapor states. The Contact Angle Test was performed four times for each sample. The results for the samples tested are shown in Table 3 below.

The samples tested herein were flat. However, accurate contact angles may be obtained on curved surfaces by using a curved baseline. Suitable software and tools for measuring contact angles in curved surfaces are also available from Krüss USA having offices at 1020 Crews Road, Suite K, Matthews, N.C., 28105-7587, USA.

TABLE 3

Contact Angle Summary

| Code | Contact Angle (degrees) | Tolerance +/− (degrees) |
| --- | --- | --- |
| 1 | 94.8 | 1.4 |
| 2 | 97.7 | 1.64 |
| 3 | 104.2 | 1.82 |
| 4 | 83.7 | 2.03 |
| 5 | 104.9 | 0.77 |
| 6 | 107.7 | 0.1 |
| 7 | 108.5 | 0.05 |
| 8 | Not tested | — |
| 9 | Not tested | — |
| 10 | 97.9 | 0.01 |
| 11 | 108.6 | 3.51 |
| 12 | 104.4 | 0.05 |
| 13 | 117.1 | 4.48 |
| 14 | 105.1 | 3.4 |
| 15 | Not tested | — |
| 16 | 105.3 | 2.4 |
| 17 | 103.9 | 1.27 |
| 18 | 105 | 0.76 |
| 19 | 111.2 | 1.98 |
| 20 | 117.7 | 2.1 |
| 21 | 102.2 | 1.16 |
| 22 | 101.1 | 1.62 |
| 23 | 109.5 | 1.98 |
| 24 | Not tested | — |
| 25 | Not tested | — |
| 26 | 103.7 | 3.01 |
| 27 | 109.8 | 1.99 |
| 28 | Not tested | — |
| 29 | 108.4 | 2.2 |
| 30 | Not tested | — |
| 31 | Not tested | — |
| 32 | 104.3 | 1.14 |
| 33 | 111.3 | 1.59 |

Based on this data, mannequins may be made having surfaces with contact angle values of about 83 to about 118 degrees, 94 to 110 degrees, 94 to 106 degrees, 94 to 98 degrees, or 94 to 95 degrees. These contact angle values more closely simulate the contact angle value of human skin, i.e., 91 degrees, than do current mannequins.

Optical Characteristics

The mannequins of the present invention may also include video image collection means, such as, for example, cameras or video recorders. The video images may be utilized to evaluate the performance of various absorbent articles and may be included within the structure of the mannequins to view the performance of the absorbent articles from "inside" of the product. For example, real time footage may be recorded of fluid flow inside a diaper when a camera is inserted into a mannequin wearing the diaper. Additionally, product fit, performance and the like may be observed from the inside of the diaper.

To enhance the use of video images, the optical properties of the mannequins of the present invention may be adapted for such purposes while still providing soft tissue properties more like that of human skin. The optical properties were determined by using the Optical Characteristics Test.

The Optical Characteristics Test was conducted using the Haze-Gard Plus haze meter, catalog number HB-4725, manufactured by BYK Gardner having offices at 9104 Guilford Road, Columbia, Md., 21046, USA. The model used illuminant CIE-O degree diffuse geometry and had a reproducibility of +/−0.4 units standard deviation. A 16 to 30 mm thick sample was held perpendicular to a beam of light so that the beam of light traveled through the sample. The haze meter then analyzed the percent transmittance, clarity, and haze of light passing through the sample. Each code tested had four trials performed. The optical properties of the tested samples are summarized in Table 4 below.

The samples subject to optical testing were degassed using a vacuum chamber (degassing) chamber, such as, a 14-inch cube stainless steel vacuum chamber available from Abbess Instruments having offices at 583 Winter Street, Holliston, Mass., 01746, USA. The samples were placed into the degassing chamber before it was cured to a solid. The chamber was sealed and a vacuum was applied which removed the air from the chamber. The air contents of the polymer were then able to effervesce thereby resulting in the air being removed from the code. The procedure ensured that air bubbles did not compromise the cured polymer's optical properties.

TABLE 4

Optical Values

| Code | Transmittance | Haze | Clarity |
|---|---|---|---|
| 1 | 85.5 | 22.7 | 45.1 |
| 2 | 57.2 | 62.9 | 13.2 |
| 3 | 93 | 8 | 80.6 |
| 4 | | Not Evaluated | |
| 5 | 88.9 | 41.8 | 25.8 |
| 6 | | Not Evaluated | |
| 7 | 94.9 | 10.5 | 56.1 |
| 8 | 65.6 | 65.8 | 43.6 |

Based on this data, mannequins may be made of materials having transmittance values of 50 to 90 percent, haze values of 8 to 65 percent and clarity values of 10 to 80 percent. In some embodiments, mannequins may be made of materials having transmittance values of 50 to 90 percent, haze values of 20 to 65 percent and clarity values of 10 to 50 percent. In some embodiments, mannequins may be made of materials having transmittance values of 80 to 90 percent, haze values of 20 to 25 percent and clarity values of 40 to 50 percent.

Indentation

As already stated herein, one of the benefits of mannequins is that they increase the pace of research that can be completed on garments, including absorbent articles, such as disposable diapers for infants and toddlers. The more closely the mannequin mimics a human subject, the more similar the performance of the absorbent article on the mannequin is to the performance of the absorbent article on a human subject. Substantial investments in research are made by companies that produce disposable diapers for infants and toddlers. Hence, one beneficial use of a mannequin system is for the testing and evaluation of disposable diapers. In order to know how performance of a test diaper on the mannequin will compare to performance of the same test diaper on a human child, it is necessary to know the mechanical response of infant soft tissue. The mechanical response includes knowing how far the skin and underlying soft tissue will indent in response to a known force, such as the force of leg elastic surrounding the legs of a wearer of a disposable diaper. Soft tissue properties of infants, particularly over the area of the body covered by a disposable diaper have been evaluated and discussed in U.S. Patent Application Publication 2005/0258199 to Honer et al., published Nov. 24, 2005, the entirety of which is incorporated herein by reference where not contradictory.

Using the soft tissue properties of infants for comparison, the "tissue" properties of mannequins can be evaluated by means of the Indentation Test. The Indentation Test utilizes an indentation device (indentor) to measure compression properties of sample mannequin materials. Generally speaking, the indentor is positioned perpendicularly to the sample being tested. As a specified force (or displacement) pushes the device against the sample, the corresponding deformation (or force) is recorded. Often, the resulting data is used to determine the Young's Modulus of the sample, which is then used as input for finite element models.

The indentor for measuring soft tissue properties uses rate controlled indentation and a load cell that measures the reaction force resulting from tissue indentation. Conversely, it can also control the loading of soft tissue and measure the resulting indentation depths. The indentor includes two portions: a hand-held indentor apparatus, and a cabinet that houses hardware and support electronics. The dimensions of the hand held portion of the indentor may be as follows: an overall length of 25.40 cm, an overall outside diameter of 6.65 cm, and a total weight of 1.11 kg. Within the handheld portion of the instrument is a motor driven dovetail slide assembly that propels a moving bed assembly. An approximately 7.94 mm outer diameter flat-surfaced indentor probe connected to a one kg load cell and displacement potentiometer extends and retracts from the enclosed container. The hand-held portion of the instrument is cabled to a cabinet that houses support electronics and related hardware including a 12 VDC rechargeable battery source, from which the indentor is powered. Finally, the instrument is interfaced to a computer for operation and data collection.

Indentation measurements were taken with approximately 2 mm thick samples layered on a 25 mm thick slab of material comprising 55 percent Dow Corning® HS IV RTV silicone and 45 percent Mold Max™ silicone thinner to negate any effects of the underlying table and to simulate an underlying core. The sample was at least 4 inches by 4 inches. The sample was placed on a horizontal table and the indentor was placed perpendicularly to the sample and centered on the sample. The indentor was held so as to maintain contact with the sample but without pressing into the sample. A support frame may be utilized to maintain the indentor in a fixed position relative to the sample surface. The indentation tests were performed four times per code. Indentation results for samples tested are summarized in Table 5 below.

TABLE 5

Indentation Values: Effective Young's Modulus (kPa) at various depths

| Sample | Depth = 0 (mm) | Depth = 1 (mm) | Depth = 2 (mm) | Depth = 3 (mm) | Depth = 4 (mm) |
|---|---|---|---|---|---|
| 9 | Not tested | Not tested | Not tested | Not tested | Not tested |
| 10 | 9.01 | 7.18 | 5.81 | 4.92 | 4.49 |
| 11 | 6.06 | 5.26 | 4.70 | 4.37 | 4.28 |
| 12 | 6.91 | 5.69 | 4.86 | 4.41 | 4.34 |
| 13 | 1.49 | 1.52 | 1.56 | 1.60 | 1.65 |
| 14 | 7.19 | 6.79 | 6.54 | 6.42 | 6.45 |
| 15 | Not tested | Not tested | Not tested | Not tested | Not tested |
| 16 | 3.78 | 4.19 | 4.54 | 4.83 | 5.06 |
| 17 | 1.43 | 1.35 | 1.29 | 1.23 | 1.20 |
| 18 | 6.33 | 6.28 | 6.21 | 6.14 | 6.06 |
| 19 | 1.84 | 1.98 | 2.08 | 2.16 | 2.21 |
| 20 | 7.65 | 6.58 | 5.66 | 4.88 | 4.26 |
| 21 | 10.98 | 8.62 | 6.79 | 5.48 | 4.71 |
| 22 | Not tested | Not tested | Not tested | Not tested | Not tested |
| 23 | 1.98 | 1.80 | 1.67 | 1.57 | 1.53 |
| 24 | Not tested | Not tested | Not tested | Not tested | Not tested |
| 25 | Not tested | Not tested | Not tested | Not tested | Not tested |
| 26 | 3.79 | 4.19 | 4.54 | 4.82 | 5.06 |
| 27 | 4.61 | 4.31 | 4.16 | 4.17 | 4.34 |
| 28 | Not tested | Not tested | Not tested | Not tested | Not tested |
| 29 | 10.33 | 8.92 | 7.81 | 7.00 | 6.48 |

TABLE 5-continued

| | Indentation Values: Effective Young's Modulus (kPa) at various depths | | | | |
|---|---|---|---|---|---|
| Sample | Depth = 0 (mm) | Depth = 1 (mm) | Depth = 2 (mm) | Depth = 3 (mm) | Depth = 4 (mm) |
| 30 | 0.44 | 0.67 | 0.88 | 1.07 | 1.23 |
| 31 | Not tested | Not tested | Not tested | Not tested | Not tested |
| 32 | 1.93 | 1.78 | 1.67 | 1.60 | 1.57 |
| 33 | 1.75 | 1.59 | 1.48 | 1.42 | 1.40 |

When evaluating Young's modulus, higher numbers indicate stiffer materials. In previous evaluations on babies, it was found that when the body site is first indented there is a lower modulus probably because of more fat and surface tissue. As the body site is further indented, the modulus increases probably because of the increased proximity to denser muscle and bone. As discussed in Horner et al., the buttocks, front of thigh, inner thigh, and hip sites of children ages 19 to 24 months were evaluated. The effective Young's modulus varied from 0.49 to 148.9 kPa across all four locations, at five different depths and spanning from the 2.5 percentile to the 97.5 percentile. Based on this data, it is believed that an Effective Young's Modulus value of about 1 to 20 kPa is desirable for materials used in mannequin simulations. However, those skilled in the art will readily appreciate that specific mannequin simulations evaluating particular features may benefit from higher or lower Effective Young's Modulus values depending upon the specific objectives of the evaluation.

Based on this data, mannequins may be made of materials having a Young's modulus of 3 to 7 kPa over the depth of 0 to 4 mm.

Compression

The Compression Test is an alternate test for determining the soft "tissue" properties of samples. The Compression Test is based on a modified STM 4473 to simulate the Indentation Test discussed above. The Compression Test utilized a 1G Sintech frame available from Sintech, Inc., a business having offices in Research Triangle Park, N.C., USA. The samples tested were at least 30 mm thick and were placed on a 25 mm lower platen. The upper platen comprised a blunt probe having a 7.94 mm outer diameter flat surface. The platens were separated by 2 inches. The blunt probe was pressed into the sample and the resisting force of the sample was measured. The resisting force (grams-force) was recorded at the surface of the sample (0 mm compression) and at 1.5 mm of compression. The difference in the force between the compression at 0 mm and the compression at 1.5 is recorded. Thee trials were run per code tested and the average difference is summarized in Table 6 below.

TABLE 6

| | Compression Values |
|---|---|
| Code | Compression (grams-force) |
| 1 | 1135 |
| 2 | 809 |
| 3 | 757 |
| 4 | 442 |
| 5 | 262 |
| 6 | 193 |
| 7 | 40 |

Mannequins

The present invention provides for mannequins having surface properties more similar to those exhibited by human skin. The materials disclosed herein are suitable for constructing new mannequins having more skin-like surface properties. The materials of the present invention are also suitable for coating existing mannequins thereby providing surface properties more similar to human skin while continuing to utilize existing mannequins.

In various embodiments, a mannequin may have a surface layer overlying a core. The surface layer may or may not be joined with the underlying core. The materials of the surface layer of the mannequins may be any suitable thickness. For example, the surface material may be less than 1 mm, 2 mm, 3 mm, 4 mm, 5 mm, 6 mm, 7 mm, 8 mm, 9 mm, or 10 mm thick. In various embodiments, the surface material may cover one or more core materials. In various embodiments, the surface materials may form a mannequin "shell". In other embodiments, the surface materials may be the outer surface of a solid mannequin.

In various embodiments, a mannequin may include any suitable core composition covered by any of the compositions disclosed herein. For example, the core material may be another mannequin. In various embodiments, a preexisting mannequin may be covered by any of the compositions disclosed herein. In various embodiments, the core materials may comprise any suitable variety of silicones as are known in the art. In various embodiments, any of the compositions disclosed herein may be used as core materials. In various embodiments, any of the compositions disclosed herein may be used as core materials and may be covered by any of the compositions disclosed herein. The surface materials may be applied in such a thin coating that the compression and indentation values of the mannequin are not significantly different than the compression and indentation values of the core materials without the surface layer.

In various embodiments, the core may comprise Dow Corning® HS IV RTV silicone and silicone thinner. In various embodiments, the core may comprise about 50 percent Dow Corning® HS IV RTV silicone and about 45 percent Mold Max™ silicone thinner.

In various embodiments, the core may comprise Shin-Etsu SES 406 silicone and SMITH'S THEATRICAL PROSTHETIC DEADENER additive. In various embodiments, the core may comprise about 33 percent Shin-Etsu SES 406 silicone and about 67 percent SMITH'S THEATRICAL PROSTHETIC DEADENER additive. A core made of these materials is expected to allow internal visual observation due to the optical characteristics.

Creating mannequins with more skin-like properties allows for better simulation of in-use performance. Situations may arise where it is desirable to focus on the effects of a single characteristic such as coefficient of friction, contact angle or indentation. Likewise, situations may arise where it is desirable to use mannequins that have a good combination of coefficient of friction, contact angle and indentation.

In various embodiments, mannequins may have improved coefficient of friction values, and contact angle values. For example, in some embodiments, mannequins may have a surface having a coefficient of friction of 0.8 to 1.28 and a contact angle of 94 to 106 degrees. Some mannequins may additionally have a compression value of less than 200 grams-force. Some mannequins may additionally have a Young's modulus of 3 to 7 kPa over the depth of 0 to 4 mm of indentation. Some mannequins having improved coefficient of friction and contact angle may also have a transmittance value of 50 to 90 percent, a haze value of 20 to 65 percent, and a clarity value of 10 to 50 percent.

In various embodiments, mannequins may have improved coefficient of friction values, contact angle values and improved optical properties. For example, in some embodiments, mannequins may have a surface layer having a coefficient of friction of 0.8 to 1.82, a contact angle of 83 to 105 degrees, a transmittance value of 50 to 90 percent, a haze value of 8 to 65 percent, and a clarity value of 10 to 80 percent. Some mannequins may additionally have a compression value of less than 200 grams-force.

The mannequins of the present invention may also include any suitable means of articulation. By adding movement, the mannequins may be more able to simulate actual use of the product by the wearer. Suitable means of articulation are disclosed in U.S. Application Publication 2005/0258199 to Honer et al., published Nov. 24, 2005, the entirety of which is incorporated herein by reference where not contradictory.

The mannequins of the present invention may include any combination of other investigative tools as are known in the art. For example, the mannequins may include pumping systems in order to simulate delivery of fluids, solids, semisolids or combinations thereof into the articles being tested. The mannequins may include sensors adapted to monitor the environment of the absorbent articles being tested. Such sensors may monitor, for example, temperature, relative humidity, pressure and/or combinations thereof. Other sensor systems may be used to monitor the movement or flow of fluids within the product during wear and when and where leakage occurs.

While the invention has been described in detail with respect to specific aspects thereof, it will be appreciated that those skilled in the art, upon attaining an understanding of the foregoing, may readily conceive of alterations to, variations of and equivalents to these aspects. Accordingly, the scope of the present invention should be assessed as that of the appended claims and any equivalents thereto.

The invention claimed is:

1. A mannequin that simulates soft tissue surface properties of human subjects, the mannequin having a surface, the surface having a coefficient of friction of 0.8 to 1.82 when moved on a 100 gram sled at 6 inches per minute across a 71 gram per square meter continuous filament stretch bonded laminate nonwoven having facings comprising 13.56 grams per square meter spunbonded polypropylene round fibers with H&P bond patterns, a contact angle of 94 to 106 degrees, a transmittance value of 50 to 90 percent, a haze value of 8 to 65 percent, and a clarity value of 10 to 80 percent.

2. The mannequin of claim 1 having a compression value of less than 200 grams-force.

3. The mannequin of claim 1 wherein the surface comprises silicone.

4. The mannequin of claim 1 wherein the surface has a coefficient of friction of 0.8 to 1.0.

5. The mannequin of claim 1 wherein the surface has a contact angle of 94 to 98 degrees.

6. The mannequin of claim 1 wherein the surface has a coefficient of friction of 0.84 to 0.96, a contact angle of 94 to 95 degrees, a transmittance value of 80 to 90 percent, a haze value of 20 to 25 percent, and a clarity value of 40 to 50 percent.

* * * * *